US010930129B2

(12) United States Patent
Noras

(10) Patent No.: US 10,930,129 B2
(45) Date of Patent: Feb. 23, 2021

(54) SELF-PROPELLED MONITORING DEVICE

(71) Applicant: Hubert Noras, Würzburg (DE)

(72) Inventor: Hubert Noras, Würzburg (DE)

(*) Notice: Subject to any disclaimer, the term of this patent is extended or adjusted under 35 U.S.C. 154(b) by 77 days.

(21) Appl. No.: 16/300,160

(22) PCT Filed: May 8, 2017

(86) PCT No.: PCT/DE2017/100389
§ 371 (c)(1),
(2) Date: Nov. 9, 2018

(87) PCT Pub. No.: WO2017/194055
PCT Pub. Date: Nov. 16, 2017

(65) Prior Publication Data
US 2019/0147715 A1 May 16, 2019

(30) Foreign Application Priority Data
May 10, 2016 (DE) .................... 10 2016 108 643.6

(51) Int. Cl.
G08B 15/00 (2006.01)
A62C 27/00 (2006.01)
(Continued)

(52) U.S. Cl.
CPC ............ G08B 15/00 (2013.01); A62C 27/00 (2013.01); G05D 1/0022 (2013.01); G05D 1/0242 (2013.01); G05D 1/0246 (2013.01); G05D 1/0255 (2013.01); G05D 1/0257 (2013.01); G05D 1/0276 (2013.01); G08B 15/02 (2013.01);
(Continued)

(58) Field of Classification Search
USPC .......................................... 701/22
See application file for complete search history.

(56) References Cited

U.S. PATENT DOCUMENTS

2004/0113777 A1* 6/2004 Matsuhira ........ G08B 13/19645
340/541
2013/0268118 A1* 10/2013 Grinstead ............. B25J 19/023
700/259
(Continued)

FOREIGN PATENT DOCUMENTS

EP 1441319 A1 7/2004
GB 2222473 3/1990
(Continued)

OTHER PUBLICATIONS

International Search Report and Written Opinion of PCT/DE2017/100389, dated Sep. 11, 2017.

Primary Examiner — Tyler D Paige
(74) Attorney, Agent, or Firm — Westman, Champlin & Koehler, P.A.

(57) ABSTRACT

A self-propelled monitoring device for autonomously patrolling a region includes a drive unit, a power supply system, at least one sensor for detecting a surrounding area, a control unit for evaluating data supplied by the sensor and for ascertaining an action to be carried out next, and a signal generating device. An image of the surrounding area is captured by the at least one sensor, and the sensor image is analyzed by the control unit. The position of a person present in the surrounding area is ascertained, and a signal which is directed towards the ascertained position is output by the signal generating device.

20 Claims, 3 Drawing Sheets

(51) Int. Cl.
  G05D 1/00 (2006.01)
  B60L 50/60 (2019.01)
  G08B 15/02 (2006.01)
  G05D 1/02 (2020.01)
  *G08B 19/00* (2006.01)
  *B60L 50/70* (2019.01)
  *B62D 55/08* (2006.01)
  *B62D 57/02* (2006.01)

(52) U.S. Cl.
  CPC ............... *B60L 50/60* (2019.02); *B60L 50/70* (2019.02); *B62D 55/08* (2013.01); *B62D 57/02* (2013.01); *G05D 2201/0209* (2013.01); *G05D 2201/0217* (2013.01); *G08B 19/005* (2013.01)

(56) References Cited

U.S. PATENT DOCUMENTS

| | | | |
|---|---|---|---|
| 2015/0205298 | A1 | 7/2015 | Stoschek et al. |
| 2015/0231784 | A1* | 8/2015 | Yamauchi ............... G06N 5/00 700/253 |
| 2016/0188977 | A1* | 6/2016 | Kearns ............... G06K 9/00664 348/113 |
| 2017/0136631 | A1* | 5/2017 | Li ..................... B60L 3/0015 |
| 2017/0225321 | A1* | 8/2017 | Deyle ................... B25J 19/023 |
| 2019/0147715 | A1* | 5/2019 | Noras ................... G08B 15/00 |
| 2020/0061839 | A1* | 2/2020 | Deyle ................... B25J 9/1697 |

FOREIGN PATENT DOCUMENTS

| | | |
|---|---|---|
| JP | 2008117132 | 5/2008 |
| JP | 2010072831 | 4/2010 |
| WO | 2017194055 A1 | 11/2017 |

\* cited by examiner

SELF-PROPELLED MONITORING DEVICE

CROSS-REFERENCE TO RELATED APPLICATION

This Application is a Section 371 National Stage Application of International Application No. PCT/DE2017/100389, filed May 8, 2017 and published as WO 2017/194055 A1 on Nov. 16, 2017, in German, the contents of which are hereby incorporated by reference in their entirety.

FIELD

The invention relates to a self-propelled monitoring device for autonomously patrolling a region, comprising a drive unit, a power supply system, at least one sensor for detecting a surrounding area, a control unit for evaluating data supplied by the sensor and for ascertaining an action to be carried out next based on the results of this evaluation, and a signal generating means.

BACKGROUND

Alarm systems serve for securing buildings, rooms or objects within a room against intrusion of, or the intervention of, unauthorized persons. They generally comprise a wide variety of sensor means, which can be connected to a central evaluation unit. However, it is also possible to dispense with such a unit and to build up an alarm system from decentralized sensor means, which are prepared such that, when the sensor is triggered, an alarm is sounded. An alarm can either consist in the transmission of acoustic or light signals that are clearly audible or visible to the intruder and the environment, for example, sirens or a flashing light, or else a silent alarm, which is not detectable for the intruder, is emitted, for example in the form of a message or a signal to a particular person or guard position.

The sensors used in alarm systems comprise, in particular, optical cameras, infrared motion detectors or infrared cameras, acoustic sensors (that is to say microphones), contact switches (for example, reed contacts) that are triggered on the opening or closing of doors or windows, pressure and/or weight sensors, trip wires, vibration sensors or glass breakage sensors (based on ultrasound).

These sensors are installed fixed in conventional alarms systems, i.e. they can always only monitor a limited area, which is determined by the place at which they are installed. In the case of cameras or IR cameras or motion detectors, this is the field of view or swivel range; in the case of acoustic sensors, that would generally be a single room or a single area; in the case of pressure or weight sensors or trip wires, this is the place at which they are installed and in the case of glass breakage sensors, it is the window to which they are assigned. Only vibration sensors can monitor a wider field; but are generally not capable of determining the exact place of origin of a signal they may intercept. Therefore, for complete monitoring of a particular area, e.g. a multi-room building, or for all sides of a building in the outer range thereof, a large number of corresponding sensors are installed. On one hand, this results in a considerable cost outlay, since a large number of sensors must be procured, installed and, if necessary, also networked. On the other hand, this fixed installation facilitates or also permits a potential intruder to prepare for his deed and to locate weaknesses in the alarm installation in that, before the actual deed, he or a helper gathers information about the construction of the alarm system and in particular about the type and positioning of the sensors used.

SUMMARY

A new approach to circumventing these weaknesses is represented by automobile monitoring devices, also known as guard robots. These are self-propelling devices that navigate autonomously through an environment, such as the interior of a building or a plot of land, and are equipped with various sensors as well as a control unit that analyses the gathered data and makes decisions based on the analysis. Simple devices of this kind that have been known for some time usually navigate with the aid of a radar and/or a lidar, which supply data that can be used relatively easily for autonomous navigation. The environment is generally monitored by means of fixed or pivotably installed cameras as well as acoustic sensors.

The data supplied by cameras or microphone(s) are not evaluated by these simple monitoring robots themselves but only either recorded or transferred directly to a command post, as is the case with the device SAM of Robot Security Systems. Although this robot is capable of navigating autonomously through a building, identification/classification of persons as authorized or unauthorized is only performed with the aid of an ID card control, wherein the controlled persons must be cooperative. Automated image or audio analysis with facial or speech recognition is not provided.

This is possible with more advanced models such as the robot model K5 of Knightscope Inc., which is described in US patent application US 2015/0205298 A1. This, too, serves only for passive monitoring, so to speak as a mobile monitoring camera, and only provides active intervention of the robot if the latter itself is threatened.

Against this background, the object of the present invention is to develop a mobile monitoring device, which is capable of autonomous patrolling of a predetermined area for improved warning and deterrence of suspicious persons.

This object is achieved by means of a self-propelled monitoring device according to claim 1, which, as a principal characteristic, is capable of transmitting a signal or a warning to detected persons that are classified as unauthorized or even threatening. This signal may be emitted either acoustically, that is to say as an acoustic signal, in particular an alarm, or in the form of a speech warning, or an optical signal is given, for example by means of a warning lamp, or in the case of a threat from a detected person, also by spotlighting said person with a bright light with dazzling effect.

The advantages of the self-propelled monitoring device according to the invention lies principally in the fact that it is capable of independently detecting a person, distinguishing between an authorized and unauthorized person, and warning or deterring the same by mean of a directed signal. It can thus be used as a kind of artificial watchdog and in particular, remain permanently activated. It thus differs in an advantageous manner from alarm systems of the prior art, which conventionally are only switched on overnight or in the absence of the residents, since they can be triggered equally by authorized or unauthorized persons. The self-driving monitoring unit according to the invention, however, can safeguard a building or a plot of land both day and night and in a targeted way only act against intruders.

Furthermore, the procurement of a monitoring device according to the invention is considerably less complicated than that of a stationary alarm system, since, for equipping the device, only a single set of sensors, that is to say camera and/or microphones and/or radar sensors is required.

Moreover, the mobility of the self-driving monitoring device already effects a very useful unpredictability with respect to potential intruders, whom this may possibly discourage from their intention, and at any rate makes it more difficult. If the self-driving monitoring unit according to the invention is equipped with corresponding drive means, such as, for example, tracks, horizontally as well as vertically pivotable wheels and/or legs, it is not only appropriately used on an individual storey of a building or on essentially plane, wheel-accessible outdoor surfaces, but can also be used in multi-storey buildings for monitoring all rooms, as well as on inaccessible outdoor surfaces.

The present invention further teaches that a plurality of similar self-driving monitoring devices according to the invention can work together in monitoring a plot of land, in order, for example, to exchange sensor data or data analysis results, or else to perform jointly coordinated actions, for example to approach an intruder from several sides, or to scour the patrol area faster in that the monitoring devices autonomously and self-coordinating, subdivide the area among themselves, while for example, taking care never to be very distant from one another.

The use of a plurality of monitoring devices according to the invention in any case increases the redundancy with respect to failure or damage of an individual unit. Furthermore, however, an effective cooperation can contribute to a faster joint identification of the situation. And, not least, the element of surprise that they have to intruders is also increased.

As soon as a self-propelled monitoring device, whether operating alone or together with others, detects a person and recognises it as an unauthorized intruder, according to the invention, they emit a signal to it by means of the signal generation device. This can either be an optical signal, such as illumination or flashing of a lamp, or else an acoustic signal, in particular a speech warning may be emitted. Moreover, the monitoring device according to the invention, if it is equipped with a corresponding transmitter or receiver device, can transmit a radio message to a monitoring centre of a security service, or else to the police. Furthermore, it would also be conceivable for a special authorized person, for example a resident or owner of the house to be instructed about the situation, for example via a mobile message such as SMS, email or by radio signal to a dedicated display and monitoring unit. This person, provided that he responds thereto directly and can produce a connection to the mobile monitoring device, seeing directly with its "eyes" or hearing with its "ears", could then also observe the situation and possibly also act on the intruder, for example, communicate with him directly, via the signal device(s) that is (are) installed in the self-driving monitoring device, such as loudspeakers or lights.

As a particularly expedient additional use, the present invention further proposes to use the self-driving monitoring unit as a fire alarm. This purpose may be served by the infrared detector or infrared camera, which may already be installed. Furthermore, it is conceivable to additionally equip the monitoring device according to the invention with a gas detector or a smoke detector.

Preferred further embodiments of the invention, which can be realized individually or in combination, are described in greater detail below.

The signals emitted by the self-driving monitoring unit according to the invention can, on one hand, be acoustic in nature, for example acoustic signals such as sirens or another alarm tone. It is particularly preferred, however, to use a speech warning, in which either a recording of a human voice is played back or else the control unit of the mobile self-driving monitoring device is prepared such that it itself can generate/synthesize speech messages adapted to the situation.

The monitoring unit according to the invention should not only be capable of detecting humans, but also of identifying them. At least it should be capable of distinguishing between authorized and unauthorized persons.

The sensors built into the monitoring device according to the invention can comprise: optical sensors, in particular cameras, infrared cameras or infrared motion detectors, acoustic sensors, in particular microphones, preferably for stereo registration, moreover radio sensors, lidar sensors as well as gas detectors or smoke detectors.

The drive unit of the self-driving monitoring device according to the invention should comprise at least three wheels, which are ideally pivotable vertically and horizontally, so that they are also suitable for climbing a step or for propulsion on rough terrain. In an even more advanced and preferred embodiment, the monitoring unit according to the invention possesses another drive based on and with the use of legs, which permit a stepping or scrabbling propulsion.

The energy supply is performed according to the invention by means of a rechargeable battery, which can be supplemented with a fuel cell, possibly together with a chemical reformer. In the first case, in which only a rechargeable battery is present, the recharging may be triggered either by human control of the self-driving monitoring unit, or else it is designed such that, when the charge falls below a minimum charging state, it automatically seeks out a charging station or plug socket, where it supplies itself with power. If a fuel cell is additionally present, fuel in gaseous or liquid form can also be replenished, which offers the advantage of a shorter charging/filling time.

The control unit of the self-driving monitoring unit according to the invention is designed as a computer, which advantageously is constructed from standard components, that is to say from commercially available CPUs and possibly further microprocessors. However, dedicated hardware or programmable processors such as FPGAs, prepared for use in the monitoring unit according to the invention can also be used.

The software running on this computer hardware is advantageously equipped such that it is prepared for image analysis and/or for speech analysis and/or for analysis of further sensor data from further sensors that may be present, such as a motion detector, an IR camera of a radar and/or of a lidar. To this end, it can in particular access the analytical methods used in the field of artificial intelligence, such as neural networks, fuzzy logic and support vector machines. The image analysis or audio analysis can be used, on one hand, for facial recognition and/or for speech recognition and/or for voice recognition and thereby first permit or at least support a detection of a human/person, and furthermore permit classification of detected persons into authorized and unauthorized.

In addition, a transponder signal can be also be used for this purpose, which is transmitted by a device which authorized persons must carry with them. This may be a dedicated transponder, or else simply one of the currently widespread mobile communication devices, such as, for example, cellphones, which all have wireless data interfaces, such as, for example, Bluetooth, which can be used for exchanging authorization and identification queries between the mobile monitoring device and a mobile communication device of an authorized user.

When the control unit of the monitoring device has recognized an unauthorized person, the present invention proposes that, besides the direct signal output to this person, a further signal may be emitted in the form of a radio signal to either a security service or else to the police. In addition to this, it would also be conceivable, e.g. By SMS or email, to inform a particular authorized person, such as a resident or owner of the house about the occurrence. The latter can then cause the mobile monitoring unit to transmit compressed sensor data in real time, and so observe the situation live and possibly also engage directly. It would thus be conceivable to control the emission of acoustic or light signals or enter into direct connection with the intruder via the loudspeaker of the mobile monitoring device.

Furthermore, the present invention proposes that, besides pure classification into authorized or unauthorized persons, the control unit of the mobile monitoring unit according to the invention can also perform a further assessment, which is oriented to the nature and the degree of threat posed by a discovered unauthorized person, which is derived from an analysis of the body language, of the voice or possibly identified arming of the person.

It is furthermore taught that the action to be chosen should be made dependent on the recognized degree of threat. Thus, for example, if no further suspicious actions are present, it can remain with a simple alarm, or else if a high level of threat is ascertained, a more severe signal deployment can also be provided, such as, for example, the dazzling of the intruder or the use of further non-lethal agents, such as tear gas and/or pepper spray and/or a water cannon and/or foul-smelling substances and/or colour marking cartridges. The latter would have the additional advantage of permitting identification of the intruder even some time after his flight.

In a preferred embodiment, the self-propelled monitoring device according to the invention is equipped with a smoke detector, in order also to contribute to early fire detection. Furthermore, fire extinguishing devices, for example, a foam extinguisher and/or a water cannon may also be present. The latter can, in addition to fire-fighting, also serve a dual function as a non-lethal weapon.

Further details and features of the present invention are described below with reference to the figures of exemplary embodiments described in greater detail. These are only intended to illustrate the invention, and in no way to limit it.

BRIEF DESCRIPTION OF THE DRAWINGS

In detail.

DETAILED DESCRIPTION OF ILLUSTRATIVE EMBODIMENTS

Figure 1:
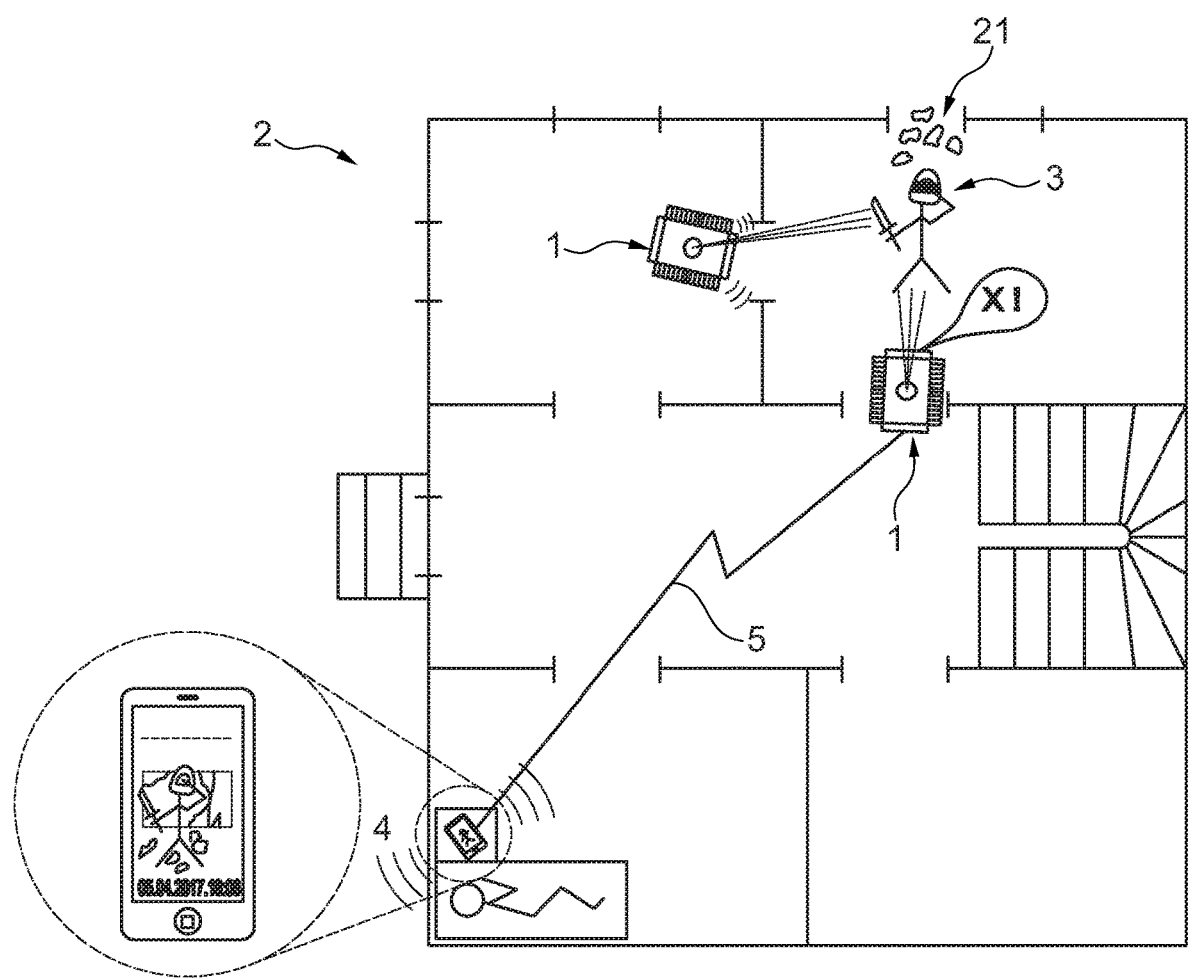
FIG. 1 shows a schematic diagram of the self-driving monitoring system proposed by the present invention.

FIG. 1 shows in top view a storey of a build 2 into which an unauthorized person 3 has intruded through a window 21. One of two self-driving monitoring units 1 according to the invention in the building 2, which are patrolling on this storey, detects this person 3 and identifies it as an unauthorized intruder by means of facial recognition, or in that facial recognition is not possible. The second self-driving monitoring unit 1, which is immediately informed and summoned by radio, approaches the intruder 3 from another side and is thereby capable of ascertaining that he is armed. In a joint analysis, the two monitoring units 1 according to the invention match their assessment of the threat. Thereupon the first generates a speech warning to the intruder 3. Furthermore, the two monitoring units 1, because of the recognized threat potential, switch on their built-in lights in order to transmit a dazzling light signal directed at the intruder 3. Likewise, the first monitoring unit 1 establishes a data connection 5 with the mobile communication device 4 of a resident of the building 2, in order to inform him of the incident and keeping him up to date about the current situation by live video feed.

Figure 2:
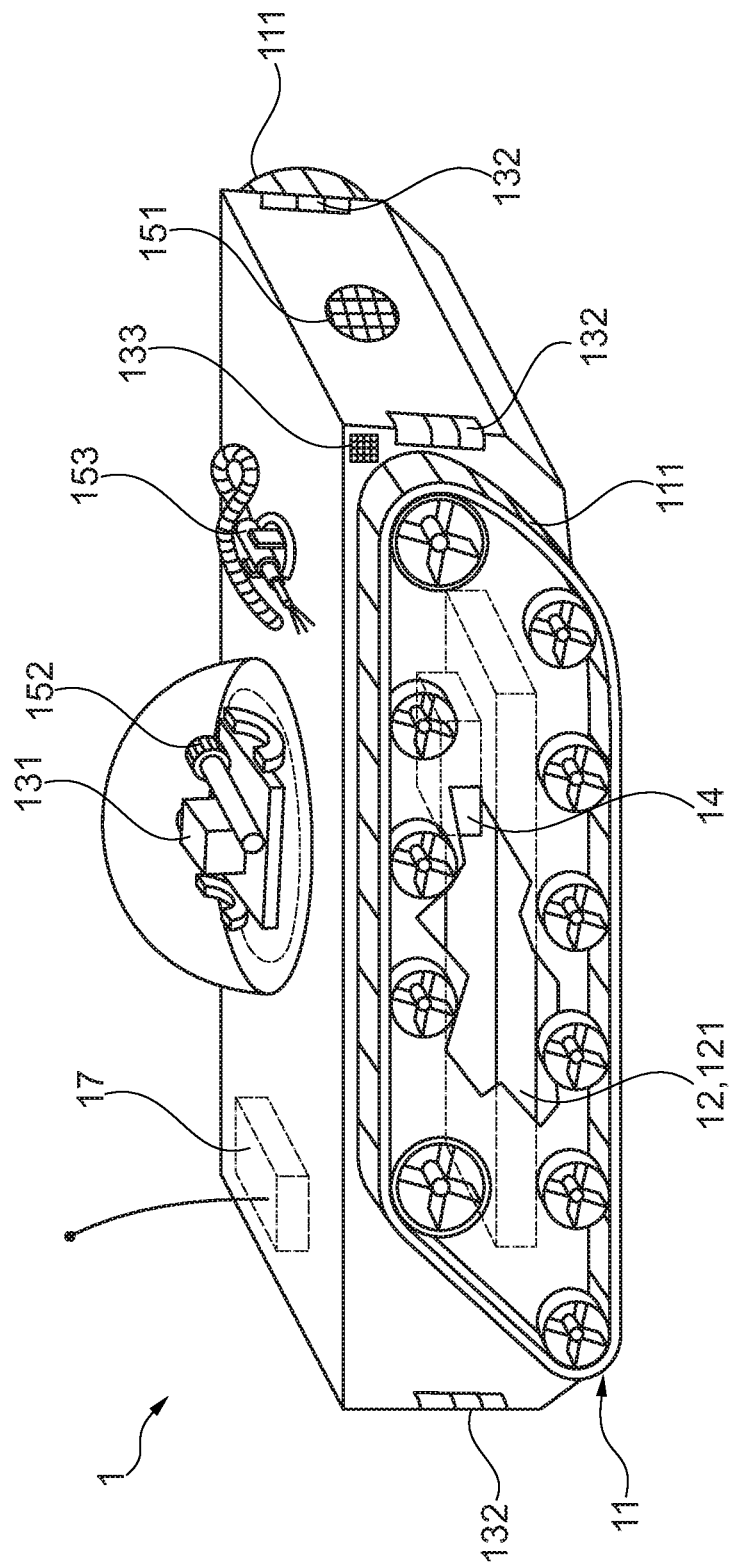
FIG. 2 shows a perspective view of a simple embodiment of a self-driving monitoring unit.

FIG. 2 shows, in perspective view, as a partial section of a preferred embodiment of an automotive monitoring device 1 according to the invention, which has a box-shaped chassis 16 and a drive unit 11, which comprises caterpillar tracks 111 on both sides. On the front side of the chassis 16, there is, on one hand, a loudspeaker opening with a loudspeaker 151 located below, by means of which a speech message can be emitted to an unauthorized person. Furthermore, on the side of the chassis 16, close to the front side, openings on both sides for a microphone 133 in each case are present. As a further characteristic feature, approximately centrally on the top side of the chassis 16, beneath a transparent hemispherical protective cover, a platform that is pivotable in azimuth and height, with an optical camera 131 mounted thereon and a light 152 that is present next to it. To identify an obstruction, this embodiment of the self-propelled monitoring device 1 according to the invention has radar sensors 132, which are integrated in the vertical edges of the chassis 16. Due to the side of the chassis being drawn partially cut open, sections of the control unit 14 and of the energy supply 12 are visible, the latter comprising a rechargeable battery 121. By means of the caterpillar tracks 111, this model of a self-propelled monitoring device according to the invention can climb on rough outdoor surfaces as well as steps within a house, as long as they are not too steep or the steps are not too high. By means of the radar sensors 132, obstructions can be recognized and driven around; the camera 131 permits a 360 degree all-round view around the monitoring device 1. The images of the camera 131 are evaluated by the internal control unit 14, however can also be viewed by an operator if the self-propelled monitoring device 1 transmits the gathered sensor data via a wireless data link 17 (indicated by a broken line) and antenna 171. Likewise, at least one microphone 133 is present; optionally, however, a second can also be installed in order to permit stereo registration. A gas detector or a smoke detector can also be installed. On the top side of the chassis 16, a water cannon 153, which is pivotable in azimuth and height is installed, which, on one hand, can serve as an additional, non-lethal weapon and on the other hand as a fire extinguisher.

Figure 3:
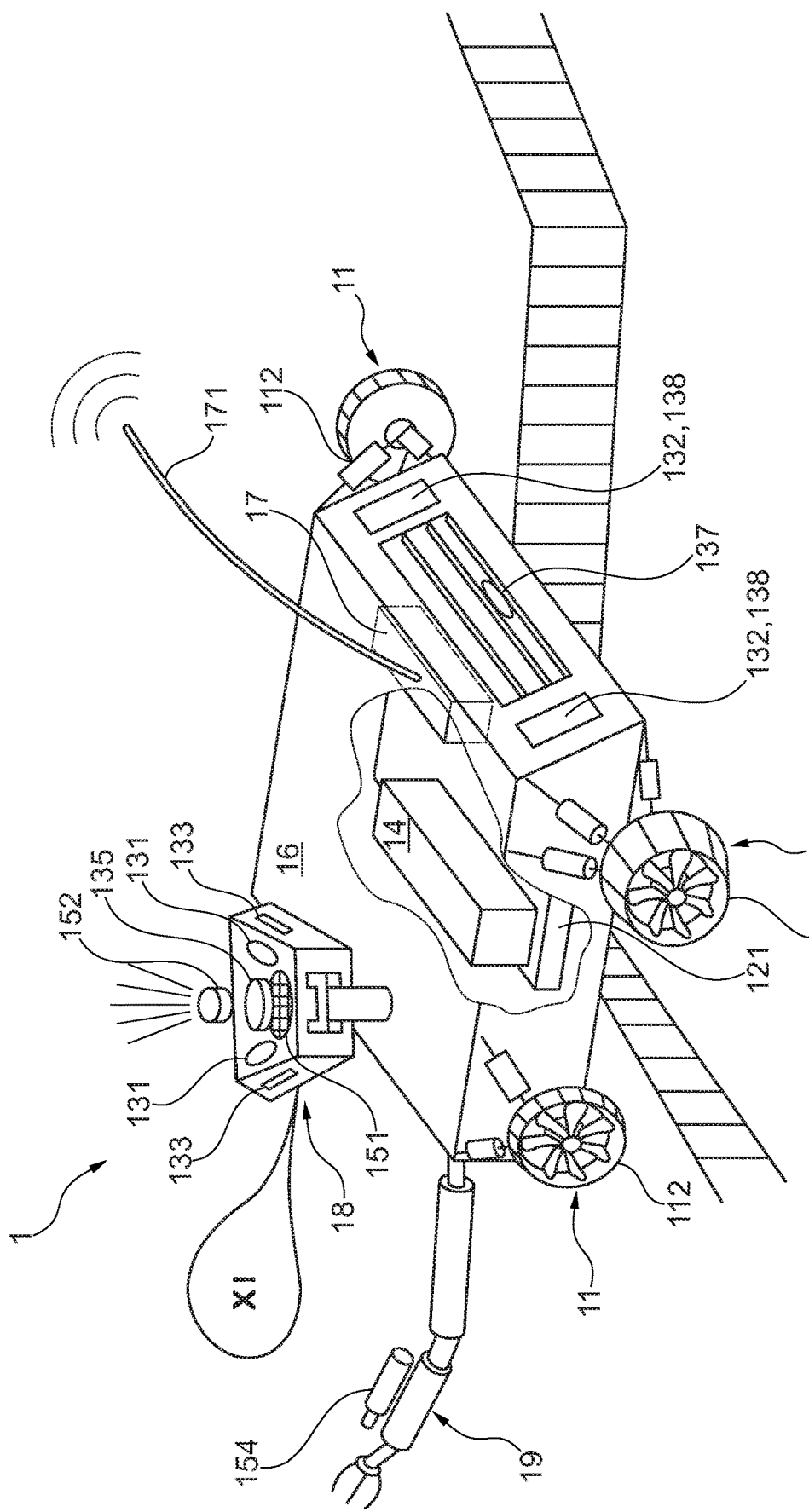
FIG. 3 shows a perspective view of a more comprehensively equipped self-driving monitoring unit according to the present invention.

FIG. 3 shows in perspective view, as a partial section, a comprehensively equipped preferred embodiment of the present invention. In contrast to the simple embodiment shown in FIG. 2, the propulsion takes place by means of vertically and horizontally pivotable wheels 112, of which a total of four are present. Instead of a camera mounted centrally on the top side of the chassis 16, a rotatable sensor support 18, which is installed in the region of an end face, with azimuthal 360-degree pivot range and also a certain pivot range vertically. Installed on or in this are, on one hand, on the front side, two optical cameras 133, which jointly can register a stereo image, an infrared camera 135 and two microphones 133 for directed sound recording, a loudspeaker 151, as well as, on the rear side (not visible), a fisheye camera. On the top side of the sensor carrier 18, a light 152 is installed, with which directed light signals, including those with a dazzle effect, can be emitted. Installed in the chassis 16 is the control unit 14, the energy supply in the form of a rechargeable battery 121 and a radio communication device 17, for establishing wireless data and/or speech links. In the interior of the chassis 16, a smoke detector 137 is located in the outlet of the cooling air duct. On the front and rear sides of the chassis 16, radar 132 and lidar 138 sensors are further installed, which, as already in the model shown in FIG. 2 of the monitoring unit according to the invention, provide the primary navigation data. On the front side of the chassis, a 3-joint manipulator arm 19 is mounted, which permits this embodiment to open and close doors, as well as to clear some obstructions out of the way. On a front element of the manipulator arm, an additional non-lethal weapon is preferably mounted, for example, as shown here, a tear-gas cannon 154. Due to the mounting on the manipulator arm 19, it is achieved that the direction of action can be changed by pivoting the arm 19, and thus advantageously no additional suspension for the tear-gas cannon 154 is required.

LIST OF REFERENCE CHARACTERS

1 Self-propelled monitoring device
11 Drive unit
111 Caterpillar tracks
112 Pivotable wheels
12 Energy supply
121 Battery
122 Charging unit
123 Charging cable
131 Optical camera
132 Radar
133 Microphone
135 Infrared camera
137 Smoke detector
138 Lidar
14 Control unit
151 Loudspeaker
152 Light
153 Water cannon, fire extinguisher
154 Tear-gas cannon
16 Chassis
17 Radio interface
18 Sensor carrier
19 Manipulator arm
2 Building
3 Unauthorized person
4 Mobile communication device
5 Data link Although the present invention has been described with reference to preferred embodiments, workers skilled in the art will recognize that changes may be made in form and detail without departing from the spirit and scope of the invention.

The invention claimed is:

1. A self-propelled monitoring device for autonomous patrolling of an area, comprising:
   a drive unit;
   an energy supply;
   at least one sensor for detecting a surrounding area and capturing a sensor image;
   a control unit for evaluating data supplied by the sensor including the sensor image, and for ascertaining an action to be carried out next; and
   a signal generating device;
   wherein:
      the control unit analyses the sensor image and, if a person is present in the sensor image, determines a position of the person in the surrounding area,
      the signal generating device emits a signal directed to the determined position, and
      the control unit assigns a degree of threat to a detected, unauthorized person with the aid of at least one of:
         an observed behavior, and
         a detection of a dangerous object or a weapon.

2. The self-propelled monitoring device according to claim 1, wherein the control unit is prepared for identifying/classifying detected persons into authorized and unauthorized persons.

3. The self-propelled monitoring device according to claim 1, wherein the signal comprises:
   an acoustic signal;
   a speech warning;
   a light signal; or
   a light signal having a dazzling effect.

4. The self-propelled monitoring device according to claim 3, wherein the signal comprises the speech warning, which comprises at least one of:
   a recorded human voice, and
   a computer-generated voice.

5. The self-propelled monitoring device according to claim 1, wherein the sensor comprises at least one of:
   an optical sensor,
   a camera,
   an infrared camera,
   an infrared motion detector,
   an acoustic sensor,
   a microphone,
   a radar sensor, and
   a lidar sensor.

6. The self-propelled monitoring device according to claim 1, wherein the sensor comprises at least one of:
   at least three wheels,
   caterpillar tracks,
   vertically and horizontally pivotable wheels, and
   legs.

7. The self-propelled monitoring device according to claim 1, wherein the energy supply comprises at least on of:
   a rechargeable battery, and
   a fuel cell.

8. The self-propelled monitoring device according to claim 1, wherein the control unit comprises at least one of:
   commercially available CPUs, and
   freely programmable FPGAs.

9. The self-propelled monitoring device according to claim 1, wherein the control unit uses a neural network for at least one of detecting obstructions, detecting humans, and classifying humans.

10. The self-propelled monitoring device according to claim 1, further comprising a transmitter and receiver unit for radio signals configured for at least one of:
    receiving remote control signals, and
    establishing a wireless communication link.

11. The self-propelled monitoring device according to claim 10, wherein the device is configured to exchange sensor data or coordinate actions with another self-propelled monitoring device.

12. The self-propelled monitoring device according to claim 1, wherein the identification/classification of persons takes place based on one of:
- facial recognition,
- voice recognition, and
- a transponder signal.

13. The self-propelled monitoring device according to claim 1, wherein, on identification of an unauthorized person, a message is transmitted to at least one of:
- a selected person,
- a security service, and
- the police.

14. The self-propelled monitoring device according to claim 1, wherein the control unit determines an action to be carried out next depending on the degree of threat of the identified unauthorized person.

15. The self-propelled monitoring device according to claim 14, wherein, at a relatively high threat level, the signal generating device emits a signal serving for deterrence in the form of a loud acoustic signal or a light signal with a dazzling effect.

16. The self-propelled monitoring device according to claim 1, further comprising a smoke detector.

17. The self-propelled monitoring device according to claim 1, further comprising a fire extinguisher.

18. The self-propelled monitoring device according to claim 1, further comprising a manipulator arm.

19. A self-propelled monitoring device for autonomous patrolling of an area, comprising:
- a drive unit;
- an energy supply;
- at least one sensor for detecting a surrounding area and capturing a sensor image;
- a control unit for evaluating data supplied by the sensor including the sensor image, and for ascertaining an action to be carried out next;
- a signal generating device; and
- at least one non-lethal weapon selected from the group consisting of a water cannon and a tear gas cannon, wherein:
- the control unit analyses the sensor image and, if a person is present in the sensor image, determines a position of the person in the surrounding area, and the signal generating device emits a signal directed to the determined position.

20. The self-propelled monitoring device according to claim 19, further comprising a smoke detector and/or a fire extinguisher.

* * * * *